US 12,084,948 B2

(12) United States Patent
Miyazaki et al.

(10) Patent No.: US 12,084,948 B2
(45) Date of Patent: Sep. 10, 2024

(54) METHOD FOR RECOVERING RARE-EARTH MUD, AND RECOVERY SYSTEM

(71) Applicant: Japan Agency for Marine-Earth Science and Technology, Kanagawa (JP)

(72) Inventors: Eigou Miyazaki, Yokosuka (JP); Yoshihisa Kawamura, Yokosuka (JP); Ikuo Sawada, Yokosuka (JP); Masanori Kyo, Yokosuka (JP); Mikito Furuichi, Yokosuka (JP); Keita Akiyama, Yokosuka (JP); Yasuhiro Namba, Yokosuka (JP)

(73) Assignee: Japan Agency for Marine-Earth Science and Technology, Kanagawa (JP)

( * ) Notice: Subject to any disclaimer, the term of this patent is extended or adjusted under 35 U.S.C. 154(b) by 0 days.

(21) Appl. No.: 17/904,804

(22) PCT Filed: Feb. 26, 2021

(86) PCT No.: PCT/JP2021/007447
§ 371 (c)(1),
(2) Date: Aug. 23, 2022

(87) PCT Pub. No.: WO2021/172540
PCT Pub. Date: Sep. 2, 2021

(65) Prior Publication Data
US 2023/0112110 A1    Apr. 13, 2023

(30) Foreign Application Priority Data
Feb. 28, 2020    (JP) ................................. 2020-033838

(51) Int. Cl.
*E21B 43/01* (2006.01)
*E21B 43/29* (2006.01)

(52) U.S. Cl.
CPC .............. *E21B 43/01* (2013.01); *E21B 43/29* (2013.01)

(58) Field of Classification Search
CPC ................................ E21B 43/01; E21B 43/29
(Continued)

(56) References Cited

U.S. PATENT DOCUMENTS

| 3,498,674 A | * | 3/1970 | Matthews | ............... E21C 25/60 299/5 |
| 7,011,167 B2 | * | 3/2006 | Ebner | ................... E21B 21/015 175/171 |
| 2018/0266074 A1 | * | 9/2018 | Halkyard | ................ E02F 7/005 |

FOREIGN PATENT DOCUMENTS

| JP | H05-026894 B2 | 4/1993 |
| JP | H08-026740 B2 | 3/1996 |

(Continued)

OTHER PUBLICATIONS

Notification of Transmittal of Translation of the International Preliminary Report on Patentability and Translation of Written Opinion of the International Searching Authority; PCT/JP2021/007447; mailed on Sep. 9, 2022.

(Continued)

*Primary Examiner* — Tara Schimpf
*Assistant Examiner* — Patrick F Lambe
(74) *Attorney, Agent, or Firm* — Studebaker & Brackett PC

(57) ABSTRACT

A method for recovering rare-earth mud including steps of: (A) penetrating a mud gathering pipe into a layer containing rare-earth mud under the seafloor, (B) preparing a slurry containing a rare earth by loosening rare-earth mud in the mud gathering pipe, and (C) transferring the slurry through a mud raising pipe. A rare-earth mud recovery system including: a mud gathering pipe configured to penetrate into a layer containing rare-earth mud under a seafloor; a stirring (Continued)

device configured to loosen rare-earth mud in the mud gathering pipe; and a mud raising pipe connected to the mud gathering pipe.

10 Claims, 4 Drawing Sheets

(58) Field of Classification Search
USPC .......................................................... 166/335
See application file for complete search history.

(56) References Cited

FOREIGN PATENT DOCUMENTS

| JP | 4162182 B2 | 10/2008 |
| JP | 2012-172418 A | 9/2012 |
| JP | 2018-071098 A | 5/2018 |
| JP | 2018-172891 A | 11/2018 |
| JP | 2019011568 A * | 1/2019 |
| JP | 2019-078016 A | 5/2019 |
| JP | 2019-120063 A | 7/2019 |
| JP | 2020-029646 A | 2/2020 |
| JP | 6653890 B2 | 2/2020 |
| WO | 1991/010808 A1 | 7/1991 |

OTHER PUBLICATIONS

International Search Report issued in PCT/JP2021/007447; mailed Apr. 6, 2021.
Ishii Shoichi et al., "Research and Development Plan on Innovative Technologies for Exploration of Deep Sea Resources", Cross-ministerial Strategic Innovation Promotion Program(SIP), URL: https://www8.cao.go.jp/cstp/english/12_deepsea_rdplan.pdf, Jul. 11, 2019, p. 1-p. 33, XP093121988.
The extended European search report issued by the European Patent Office on Jan. 31, 2024, which corresponds to European Patent Application No. 21761073.2-1002 and is related to U.S. Appl. No. 17/904,804.

* cited by examiner

METHOD FOR RECOVERING RARE-EARTH MUD, AND RECOVERY SYSTEM

TECHNICAL FIELD

The present invention relates to a method for recovering rare-earth mud and a recovery system.

BACKGROUND ART

In the ocean floor across the globe, there are a large quantity of liquid and gaseous natural resources including oil and natural gas. Also, the existence of solid mineral resources such as manganese nodules has also become clear. Patent Literature 1 to 4 disclose a method for extracting liquid or gaseous natural resources, and a method for mining mineral resources at a relatively shallow seafloor.

CITATION LIST

Patent Literature

[Patent Literature 1] Japanese Unexamined Patent Publication No. 2012-172418
[Patent Literature 2] Japanese Unexamined Patent Publication No. 2019-120063
[Patent Literature 3] Japanese Unexamined Patent Publication No. 2019-011568
[Patent Literature 4] Japanese Examined Patent Publication No. H8-26740

SUMMARY OF INVENTION

Technical Problem

It has been ascertained that a layer of mud containing rare earths is present under the seafloor in deep sea having a water depth of more than 5000 m. This mud is called rare-earth mud and has been attracting attention as a new resource. However, a technology for efficiently extracting rare-earth mud from such a deep seafloor has not yet been established. The present invention provides a method for recovering rare-earth mud and a recovery system that can be applied to even a layer under the seafloor in deep sea having a water depth of more than 5000 m.

Solution to Problem

A method for recovering rare-earth mud according to the present invention includes steps of: (A) penetrating a mud gathering pipe into a layer containing rare-earth mud under the seafloor, (B) preparing a slurry containing a rare earth by loosening rare-earth mud in the mud gathering pipe, and (C) transferring the shiny through a mud raising pipe.

According to the recovery method described above, since mud loosening and slurry preparation are performed in the mud gathering pipe isolated from an environment in the vicinity of the seafloor, a slurry having a concentration suitable for mud raising can be stably prepared. Also, since a disturbance generated in the sea by loosening the mud (for example, stirring the rare-earth mud in the sea) in the step (B) is generated in a closed space in the mud gathering pipe, an environmental load can be reduced. Further, the "slurry containing a rare earth" as used in the present invention means a rare-earth mud having fluidity, or a mixed fluid containing at least a rare-earth mud and seawater.

The mud raising pipe has, for example, a double pipe structure. In this case, the slurry containing a rare earth can be transferred by a circulating flow.

It is preferable that the recovery method further include a step (step of mud picking) of transferring the slurry in the mud gathering pipe into the mud raising pipe between the steps (B) and (C). This step can be performed, for example, by utilizing a pump. It is preferable that the recovery method further include a step before the step (C) of switching the mud raising pipe to a state in which it does not communicate with the mud gathering pipe, after transferring the slimy in the mud gathering pipe into the mud raising pipe. When such a step is performed, a pressure required for transferring the slurry in the mud raising pipe in the step (C) can be prevented from affecting a pressure in the mud gathering pipe. Specifically, it is possible to prevent a phenomenon (hereinafter referred to as "boiling") in which a sealed state between the mud gathering pipe and the layer in the seafloor is released by the pressure required for transferring the slurry and a fluid leaks out from between the mud gathering pipe and the layer in the seafloor.

In the step (A), the following items may be implemented so that the mud gathering pipe can easily settle in a layer below the seafloor. For example, the mud gathering pipe may be settled while injecting a fluid downward from a nozzle provided at a distal end portion of the mud gathering pipe, or the mud gathering pipe may be settled by negative pressurization inside the mud gathering pipe.

A rare-earth mud recovery system includes a mud gathering pipe configured to penetrate into a layer containing rare-earth mud under the seafloor, a stirring device configured to loosen rare-earth mud in the mud gathering pipe, and a mud raising pipe connected to the mud gathering pipe. According to the recovery system, since mud loosening and slurry preparation can be performed in the mud gathering pipe isolated from an environment in the vicinity of the seafloor, a slurry having a concentration suitable for mud pumping can be stably prepared. Also, since a disturbance generated in the sea by loosening the rare-earth mud (for example, stirring the rare-earth mud in the sea) can be generated in a closed space in the mud gathering pipe, an environmental load caused by that can be reduced.

The recovery system may further include a pump that transfers the slurry in the mud gathering pipe into the mud raising pipe. The pump may be utilized to take out the seawater in the mud gathering pipe to make it have a negative pressure in the step (A). The recovery system may further include a nozzle provided at the distal end portion of the mud gathering pipe. The nozzle can be utilized to settle the mud gathering pipe while injecting a fluid downward in the step (A).

It is preferable that the recovery system further include a flow path switching mechanism configured to be switchable between a state in which the mud gathering pipe and the mud raising pipe communicate and a state in which the mud gathering pipe and the mud raising pipe do not communicate. When such a configuration is employed, a pressure required for transferring the slurry in the mud raising pipe can be prevented from affecting a pressure in the mud gathering pipe, and specifically, occurrence of boiling can be prevented.

Advantageous Effects of Invention

According to the present invention, a method for recovering rare-earth mud and a recovery system that can be applied to even a layer under the seafloor in deep sea having a water depth of more than 5000 m are provided.

DESCRIPTION OF EMBODIMENTS

Hereinafter, embodiments of the present invention will be described with reference to the drawings. The present invention is not limited to the following embodiments.
<Rare-Earth Mud Recovery System>

Figure 1:
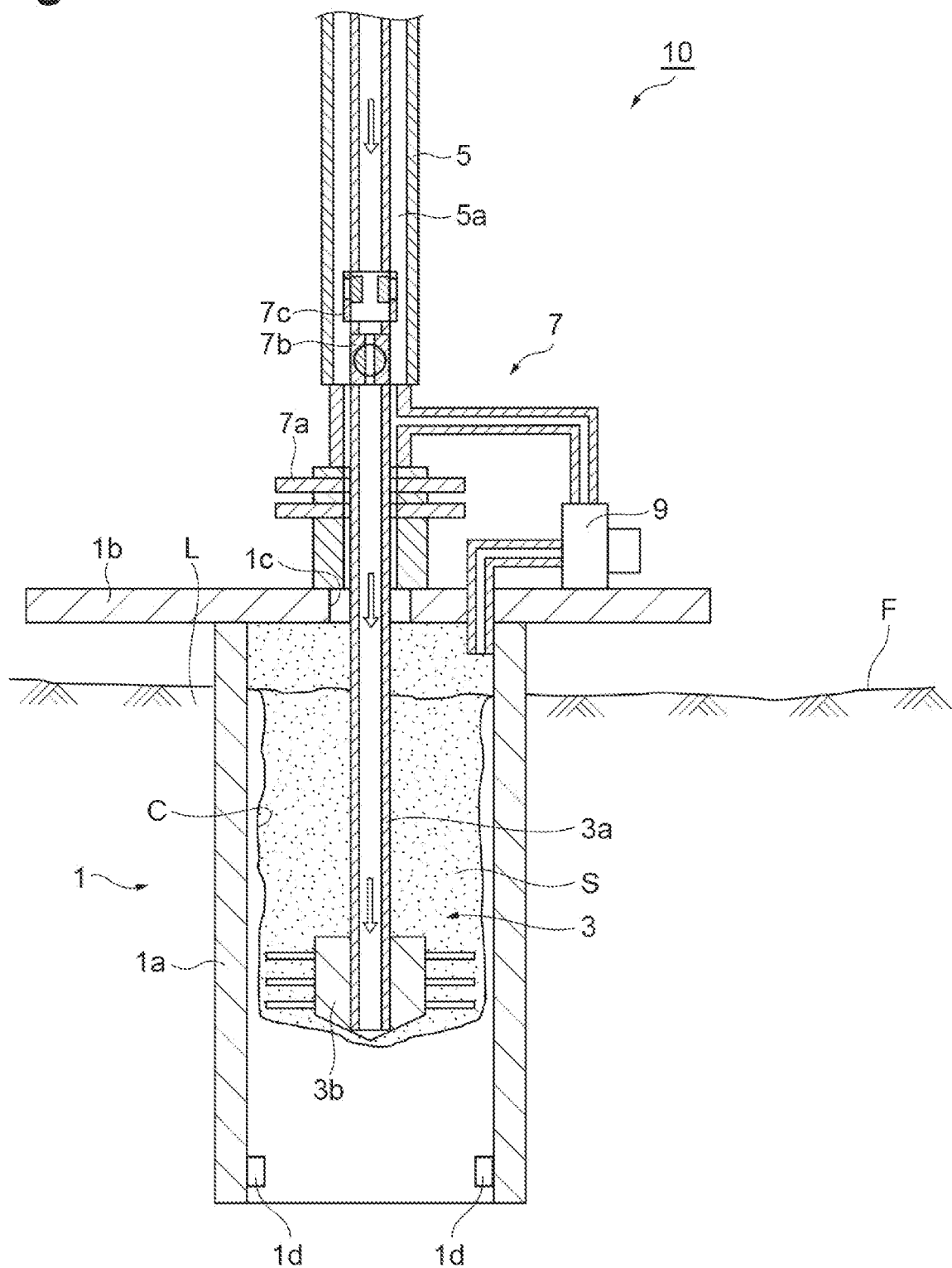
FIG. 1 is a cross-sectional view schematically illustrating one embodiment of a rare-earth mud recovery system according to the present invention.

FIG. 1 is a cross-sectional view schematically illustrating a rare-earth mud recovery system according to the present embodiment. The recovery system 10 is for recovering rare-earth mud present in a layer L under a seafloor F in deep sea having a water depth of more than 5000 m in a form of slurry. FIG. 1 illustrates a state in which loosening the rare-earth mud is performed by a stirring device 3. The recovery system 10 includes a mud gathering pipe 1 configured to penetrate into the layer L under the seafloor F, the stirring device 3, a mud raising pipe 5 connected to the mud gathering pipe 1, a flow path switching mechanism 7, and a subsea pump 9.

The mud gathering pipe 1 is for forming a space isolated from an environment in the vicinity of the seafloor. A slurry S containing the rare-earth mud is prepared in a sealed space in the mud gathering pipe 1. The mud gathering pipe 1 is constituted by a cylindrical part 1a, an upper plate 1b that closes an upper end of the cylindrical part 1a, an opening 1c that penetrates the upper plate 1b, and a plurality of nozzles 1d provided at a distal end portion. An inner diameter of the cylindrical part 1a is, for example, 3 to 5 m. A length of the cylindrical part 1a in a vertical direction is, for example, 12 to 20 m. The mud gathering pipe 1 in FIG. 1 is in a state in which a distal end thereof is penetrated into the layer L to such an extent that the distal end reaches a depth of 11 to 19 m from the seafloor F. The plurality of nozzles 1d are configured to be able to inject a fluid (for example, seawater) downward, and can be used when the mud gathering pipe 1 is settled in the layer L.

The stirring device 3 is constituted by a drill pipe 3a extending from a ship (not illustrated) on the sea, and a blade 3b provided on a lower end and an outer side of the drill pipe 3a. It is configured such that the blade 3b rotates according to rotation of the drill pipe 3a, and the blade 3b moves in the vertical direction according to vertical movement of the drill pipe 3a. When the blade 3b moves downward while rotating in the mud gathering pipe 1, a depression C is formed in the layer L, rare-earth mud is mixed with seawater, and thereby the slurry S having fluidity is obtained.

The mud raising pipe 5 is connected to the opening 1c of the mud gathering pipe 1 via the flow path switching mechanism 7. The mud raising pipe 5 can be switched between a state of communicating with the mud gathering pipe 1 and a state of not communicating with the mud gathering pipe 1 by an operation of the flow path switching mechanism 7. The mud raising pipe 5 can generate a circulating flow together with the drill pipe 3a in a state in which it does not communicate with the mud gathering pipe 1. Specifically, the mud raising pipe 5 forms a double pipe together with the drill pipe 3a, and can allow the drill pipe 3a (inner pipe) and an annulus part 5a (region defined by an outer surface of the drill pipe 3a and an inner surface of the mud raising pipe 5) to communicate at a position above the upper plate 1b (see FIG. 4).

The flow path switching mechanism 7 is constituted by a plurality of and a plurality of types of valves, lines (pipes), and the like. The flow path switching mechanism 7 is operated from the ship or by an ROV (remotely operated unmanned underwater vehicle). The flow path switching mechanism 7 includes, for example, an annulus blocking mechanism 7a that blocks the annulus part 5a as needed, a drill pipe blocking valve 7b that blocks the drill pipe 3a as needed, a shutter mechanism 7c that allows the inside of the drill pipe 3a and the annulus part 5a to communicate as needed, a subsea control device (not illustrated) for controlling them, and a subsea accumulator (not illustrated) serving as a power source for them. The drill pipe blocking valve 7b is provided at a position on the drill pipe 3a corresponding to a lower end of the mud raising pipe 5, and when the drill pipe blocking valve 7b is operated, the mud raising pipe 5 can be brought into a state in which it does not communicate with the mud gathering pipe 1. The shutter mechanism 7c is provided at a position on the drill pipe 3a higher than that of the drill pipe blocking valve 7b, and when the shutter mechanism 7c and the annulus blocking mechanism 7a are operated, the inside of the drill pipe 3a and the annulus part 5a are allowed to communicate at that position.
<Method for Recovering Rare-Earth Mud>

Figure 3:
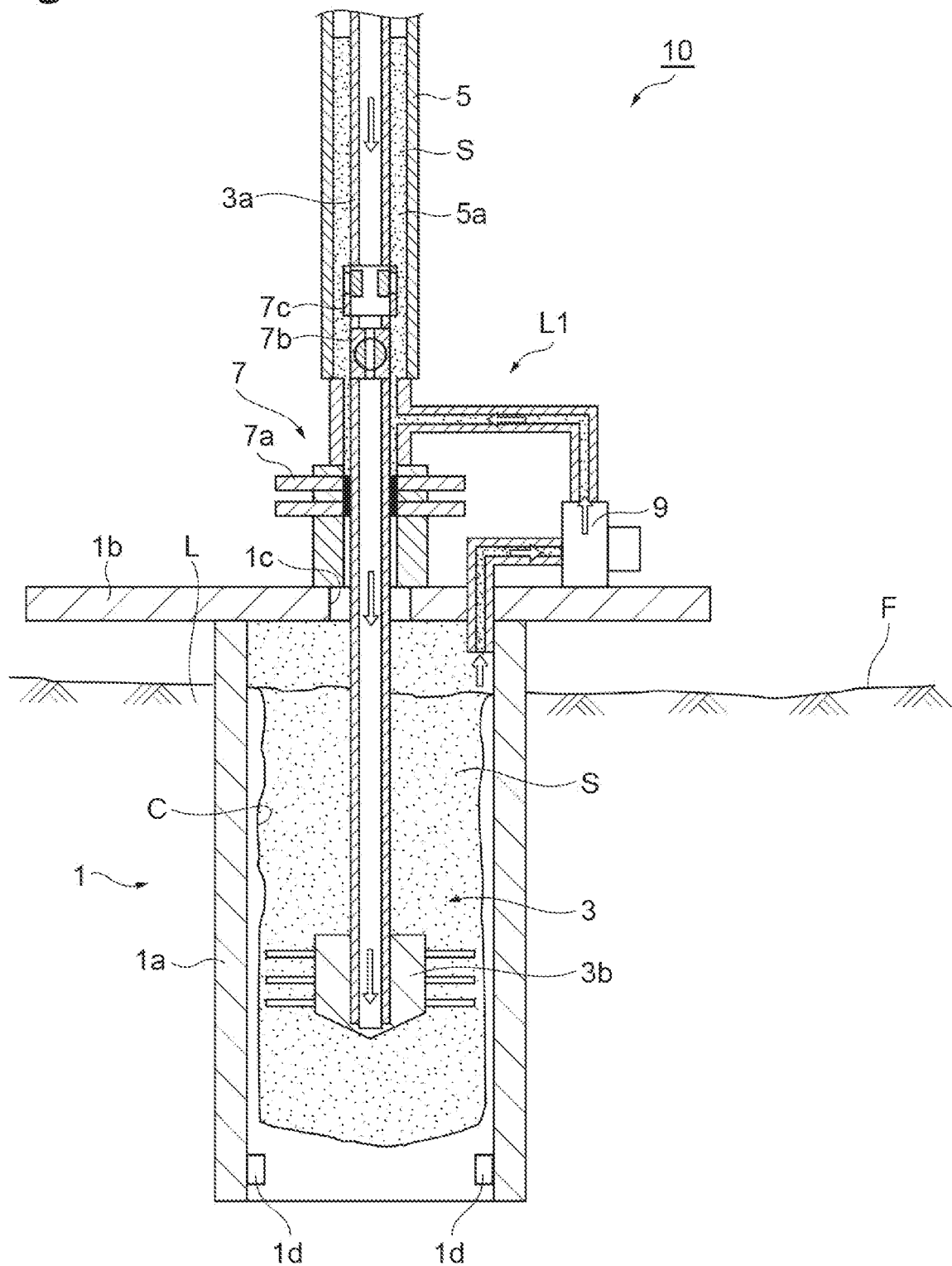
FIG. 3 is a cross-sectional view schematically illustrating a state in which a slurry in the mud gathering pipe is transferred to a mud raising pipe.
Figure 4:
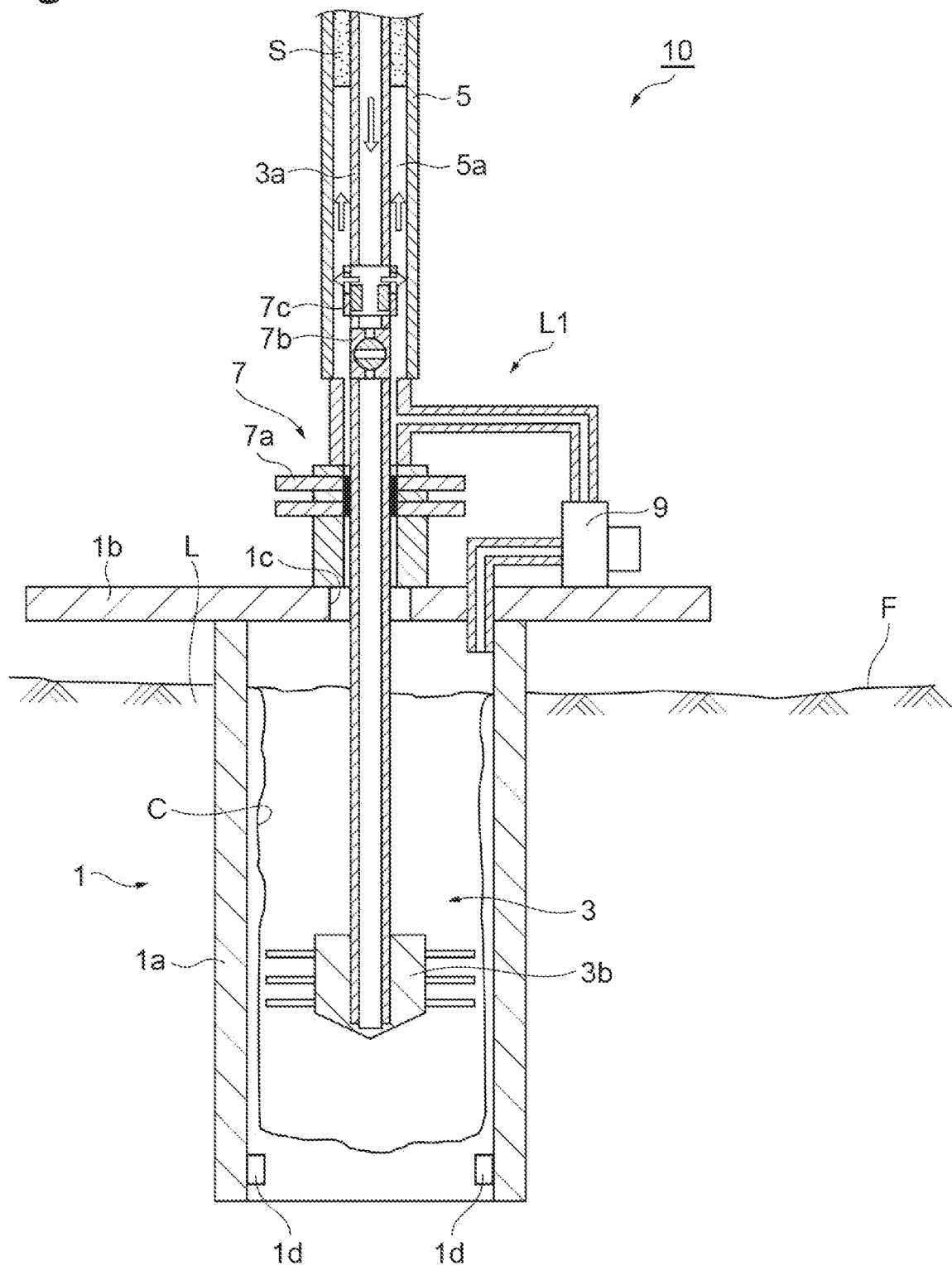
FIG. 4 is a cross-sectional view schematically illustrating a state in which the slurry in the mud raising pipe is transferred upward by a circulating flow.

A method of recovering rare-earth mud using the recovery system 10 will be described with reference to FIGS. 1 to 4. The method for recovering rare-earth mud according to the present embodiment includes the following steps;

(a) penetrating the mud gathering pipe 1 into the layer L containing rare-earth mud under the seafloor F (see FIG. 2), (b) preparing the slurry S containing a rare earth by loosening rare-earth mud in the mud gathering pipe 1 (see FIG. 1), (c) transferring the slurry S in the mud gathering pipe 1 into the mud raising pipe 5 (see FIG. 3), and (d) transferring the slurry S toward a ship on the sea through the mud raising pipe 5 (see FIG. 4).

Figure 2:
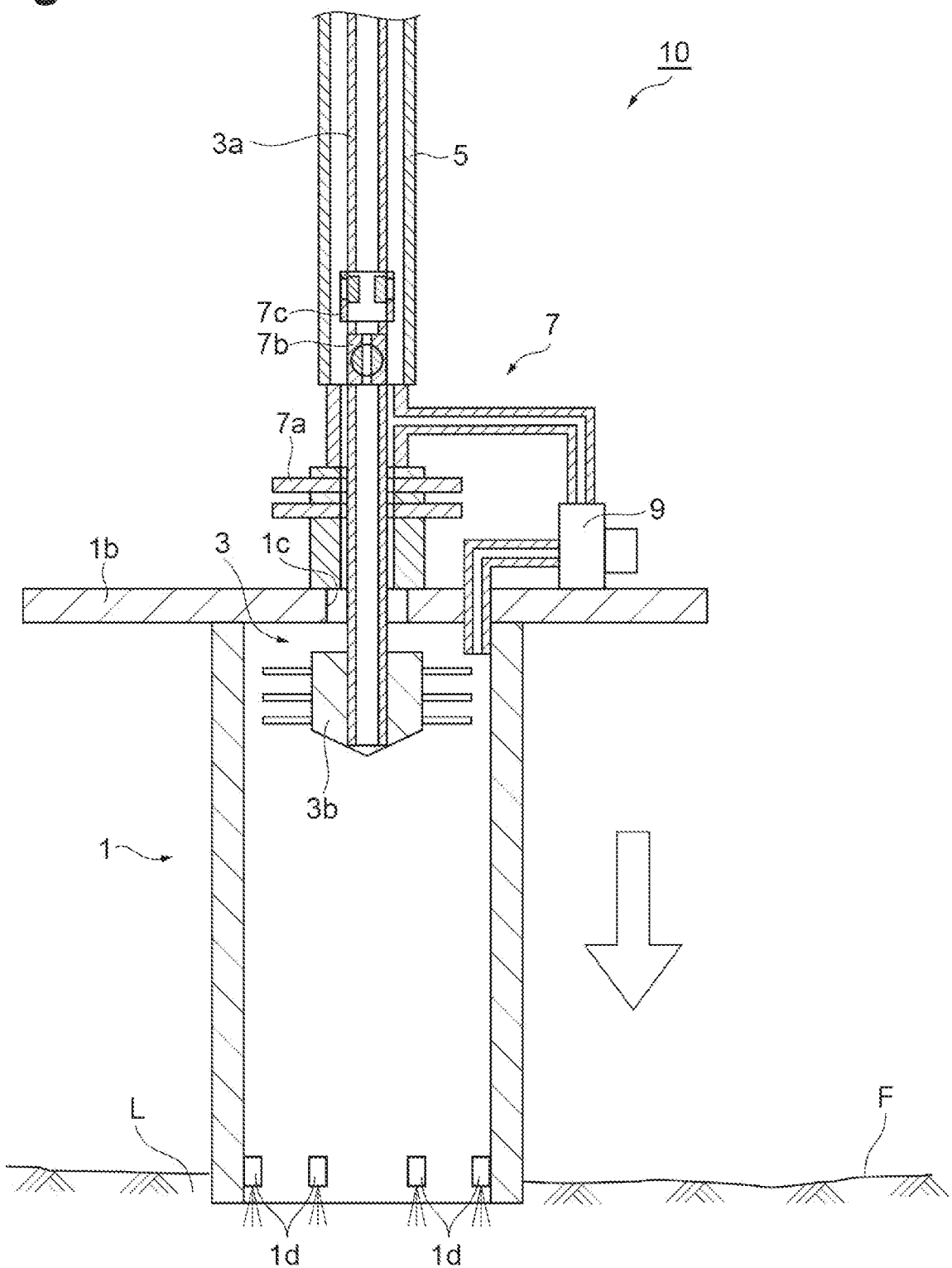
FIG. 2 is a cross-sectional view schematically illustrating a state in which a mud gathering pipe is penetrated into a layer under the seafloor.

As illustrated in FIG. 2, the step (a) is a step of penetrating the mud gathering pipe 1 into the layer L under the seafloor F. With the flow path switching mechanism 7 and the mud gathering pipe 1 attached to a distal end of the mud raising pipe 5, the mud raising pipe 5 is lowered from the ship, and a distal end side of the mud gathering pipe 1 is stuck into the seafloor F. The mud gathering pipe 1 sinks into the layer L due to the weight of the mud gathering pipe 1. In order to promote the sinking of the mud gathering pipe 1, after the distal end of the mud gathering pipe 1 is brought into a state of being in contact with the seafloor F, a negative pressure may be generated in the mud gathering pipe 1 by driving the subsea pump 9 and suctioning seawater in the mud gathering pipe 1. Also, the mud gathering pipe 1 may be settled while injecting a fluid toward the layer L from the plurality of nozzles 1d provided at a distal end portion of the mud gathering pipe 1.

The step (b) is a step of preparing the slurry S in the mud gathering pipe 1 by loosening the rare-earth mud with the blade 3b (see FIG. 1). The blade 3b is lowered in the mud raising pipe 5 in a state of being attached to a distal end of the drill pipe 3a and reaches the inside of the mud gathering pipe 1. Seawater is supplied from the ship through the drill pipe 3a, and while the seawater is ejected from an opening (not illustrated) of the blade 3b, the blade 3b is rotated and gradually lowered. Thereby, the rare-earth mud is loosened in the mud gathering pipe 1 and becomes a fine particulate form. When the rare-earth mud is loosened, the slurry S is prepared in the mud gathering pipe 1. A concentration of the slurry S can be adjusted by adjusting an amount of seawater supplied from the ship. Further, physical properties such as a density of the slurry S can be measured by a sensor disposed or dropped in the mud gathering pipe 1.

The step (c) is a step of transferring the slurry S in the mud gathering pipe 1 into the mud raising pipe 5 (see FIG. 3). First, the annulus blocking mechanism 7a is operated to bring the annulus part 5a of the mud raising pipe 5 into a blocked state and open a line L1. In this state, seawater is supplied into the mud gathering pipe 1 through the drill pipe 3a, and the subsea pump 9 is driven. Thereby, the slurry S in the mud gathering pipe 1 is transferred into the mud raising pipe 5 through the line L1. This process is called mud picking. In order to push up the slurry S in the mud gathering pipe 1 into the mud raising pipe 5, a pressure in the mud gathering pipe 1 is not necessary to be increased compared to a case of pushing up the slurry to the ship on the sea, and thus occurrence of boiling can be prevented.

The step (d) is a step of transferring the slurry S, that has been transferred into the mud raising pipe 5 through the step (c), toward the ship on the sea (see FIG. 4). While the annulus part 5a is maintained in a blocked state, the line L1 is brought into a blocked state. The drill pipe blocking valve 7b is operated to bring the drill pipe 3a to a state of not communicating with the mud gathering pipe 1. Also, the shutter mechanism 7c is operated to allow the inside of the drill pipe 3a and the annulus part 5a to communicate. In this state, when seawater is supplied from the drill pipe 3a, a circulating flow can be generated in the mud raising pipe 5, and the slurry S is transferred onto the ship through the annulus part 5a (see the arrow in FIG. 4). This process is called mud raising. Further, a transfer destination of the slurry S is not limited to a ship on the sea, and may be, for example, a processing facility in the sea, on the sea, or on land.

According to the above-described embodiment, since mud loosening and slurry preparation are performed in the mud gathering pipe 1, a slurry having a concentration suitable for mud pumping can be stably prepared. Also, since the mud loosening in the step (b) is performed in a closed space in the mud gathering pipe 1, a disturbance in the sea can be prevented and an environmental load can be reduced. Also, since the mud pumping in the step (d) is performed in a state in which the mud raising pipe 5 does not communicate with the mud gathering pipe 1, a pressure required for the mud pumping of the slurry S is prevented from affecting a pressure in the mud gathering pipe 1, and specifically, occurrence of boiling can be prevented.

Although the embodiments of the present invention have been described in detail above, the present invention is not limited to the embodiments described above. For example, in the above-described embodiment, a case in which the slurry S is transferred from the mud gathering pipe 1 to the mud raising pipe 5 by utilizing the subsea pump 9 has been exemplified, but the slurry S in the mud gathering pipe 1 may be pushed up to the mud raising pipe 5 by supplying a replacement material having a density (specific gravity) higher than that of the slurry S to the mud gathering pipe 1.

Also, in the above-described embodiment, a case of recovering rare-earth mud from under the seafloor in deep sea having a water depth of more than 5000 m has been exemplified, but the present invention may be applied to a sea area shallower than that (for example, a water depth of 1000 to 3000 m or 3000 to 5000 m).

REFERENCE SIGNS LIST

1: mud gathering pipe, 1a: cylindrical part, 1b: upper plate, 1c: opening, 1d: nozzle, 3: stirring device, 3a: drill pipe, 3b: blade, 5: mud raising pipe, 5a: annulus part, 7: flow path switching mechanism, 7a: annulus blocking mechanism, 7b: drill pipe blocking valve, 7c: shutter mechanism, 9: subsea pump (pump), 10: recovery system, C: depression, F: seafloor, L: layer, L1: line

The invention claimed is:

1. A method for recovering rare-earth mud comprising:
(A) inserting a mud gathering pipe into a layer containing rare-earth mud under a seafloor;
(B) preparing a slurry containing a rare earth by rotating a stirring device within the mud gathering pipe to loosen the rare-earth mud; and
(C) transferring the slurry through a mud raising pipe,
wherein the stirring device includes a drill pipe having a lower portion extending into the mud gathering pipe and an upper portion extending outside the mud gathering pipe,
wherein the mud raising pipe extends around the upper portion of the drill pipe to form a double pipe structure,
wherein the slurry is transferred by a circulating flow through an annulus part of the double pipe structure, that is formed between an outer surface of the drill pipe and an inner surface of the mud raising pipe, and
wherein the method further comprises directing a fluid from inside the drill pipe into the annulus part via an opening of the drill pipe that faces the inner surface of the mud raising pipe, to generate the circulating flow.

2. The method for recovering rare-earth mud according to claim 1, wherein the slurry is transferred through a flow path that extends from an outlet of the mud gathering pipe to an inlet of the double pipe structure of the mud raising pipe.

3. The method for recovering rare-earth mud according to claim 2, wherein the slurry is transferred through the flow path by a pump.

4. The method for recovering rare-earth mud according to claim 1, further comprising blocking a communication between the mud raising pipe and the mud gathering pipe, after transferring the slurry from the mud gathering pipe into the mud raising pipe.

5. The method for recovering rare-earth mud according to claim 1,
wherein the mud gathering pipe has an upper end that is closed and a distal end located opposite the upper end,
wherein the mud gathering pipe includes a nozzle located at the distal end,
wherein the mud gathering pipe is inserted into the seafloor while injecting a fluid downward from the nozzle of the mud gathering pipe.

6. The method for recovering rare-earth mud according to claim 1, wherein the mud gathering pipe is inserted into the seafloor by applying a negative pressurization inside the mud gathering pipe.

7. A rare-earth mud recovery system comprising:
a mud gathering pipe configured to penetrate into a layer containing rare-earth mud under a seafloor;
a stirring device that extends inside the mud gathering pipe, wherein the stirring device is rotatably coupled with the mud gathering pipe to prepare a slurry of the rare-earth mud via a rotation of the stirring device in the mud gathering pipe; and
a mud raising pipe connected to the mud gathering pipe to transfer the slurry,
wherein the stirring device includes a drill pipe having a lower portion extending into the mud gathering pipe and an upper portion extending outside the mud gathering pipe,
wherein the mud raising pipe extends around the upper portion of the drill pipe to form a double pipe structure, and
wherein the drill pipe has an opening that faces an inner surface of the mud raising pipe.

8. The rare-earth mud recovery system according to claim 7, further comprising a pump that is located in a flow path that connects the mud gathering pipe to the double pipe structure of the mud raising pipe.

9. The rare-earth mud recovery system according to claim 7, further comprising a valve switch configured to selectively open or block a fluid communication between the mud gathering pipe and the mud raising pipe.

10. The rare-earth mud recovery system according to claim 7,
wherein the mud gathering pipe has an upper end that is closed and a distal end located opposite the upper end, and
wherein the mud gathering pipe includes a nozzle located at the distal end to inject a fluid into the mud gathering pipe.

* * * * *